US011216937B2

(12) United States Patent
Sun et al.

(10) Patent No.: US 11,216,937 B2
(45) Date of Patent: Jan. 4, 2022

(54) SPACER SUPPORTABILITY EVALUATION METHOD AND DEVICE, COMPUTER READABLE STORAGE MEDIUM

(71) Applicant: BOE Technology Group Co., Ltd., Beijing (CN)

(72) Inventors: Xuefei Sun, Beijing (CN); Xinxing Wang, Beijing (CN); Jaegeon You, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 465 days.

(21) Appl. No.: 16/336,761

(22) PCT Filed: Sep. 11, 2018

(86) PCT No.: PCT/CN2018/104978
§ 371 (c)(1),
(2) Date: Mar. 26, 2019

(87) PCT Pub. No.: WO2019/137035
PCT Pub. Date: Jul. 18, 2019

(65) Prior Publication Data
US 2021/0327039 A1    Oct. 21, 2021

(30) Foreign Application Priority Data
Jan. 15, 2018  (CN) .......................... 201810035923.9

(51) Int. Cl.
*G06T 7/00*       (2017.01)
*G02F 1/1339*   (2006.01)
(Continued)

(52) U.S. Cl.
CPC ............ *G06T 7/001* (2013.01); *G02F 1/1309* (2013.01); *G02F 1/13392* (2013.01); *G06T 7/13* (2017.01); *G06T 2207/30121* (2013.01)

(58) Field of Classification Search
CPC .... G01N 2001/4088; G01N 2021/8488; H01L 2224/49431; H01L 2224/49433
See application file for complete search history.

(56) References Cited

U.S. PATENT DOCUMENTS 5,717,287 A * 2/1998 Amrine .................... H01J 9/242
313/495
7,803,319 B2 * 9/2010 Yang ................. G01N 33/54366
422/423
(Continued)

Primary Examiner — Yosef Kassa
(74) Attorney, Agent, or Firm — Myers Bigel P.A.

(57) ABSTRACT

A spacer supportability evaluation method and device as well as a computer readable storage medium are provided. The method includes acquiring initial distribution images of spacers and corresponding support pads on a substrate, performing binary grayscaling processing to obtain distribution images of spacers and corresponding support pads, obtaining two binary matrices according to the distribution images, subjecting the two binary matrices to convolution in a spatial domain or to multiplication in a frequency domain to obtain an equivalent support matrix, calculating a number of elements in the equivalent support matrix whose values are a first value to obtain a number of supported pixels. The supportability of spacers is evaluated by acquiring parameters or design drawings of the spacers to calculate suitable size and positional arrangement of each spacer, improving the supportability of spacers and keeps the cell gap of the liquid crystal cell stable and uniform.

17 Claims, 4 Drawing Sheets

(51) Int. Cl.
*G02F 1/13* (2006.01)
*G06T 7/13* (2017.01)

(56) References Cited

U.S. PATENT DOCUMENTS

| | | | | |
|---|---|---|---|---|
| 8,243,027 | B2* | 8/2012 | Hotelling | G06F 3/04164 345/173 |
| 8,531,432 | B2* | 9/2013 | Moriwaki | G06F 3/0446 345/174 |
| 8,672,905 | B2* | 3/2014 | Riesinger | A61F 13/00063 604/304 |
| 9,475,049 | B2* | 10/2016 | Siciliano | B01L 3/5023 |
| 2015/0024415 | A1* | 1/2015 | Lu | G01N 33/558 435/7.72 |

* cited by examiner

SPACER SUPPORTABILITY EVALUATION METHOD AND DEVICE, COMPUTER READABLE STORAGE MEDIUM

CROSS REFERENCE TO RELATED APPLICATIONS

The present application is a 35 U.S.C. 371 national stage application of PCT International Application No. PCT/CN2018/104978, filed on Sep. 11, 2018, which claims the benefit of Chinese Patent Application No. 201810035923.9, filed on Jan. 15, 2018, the contents of which are incorporated herein by reference in their entireties.

TECHNICAL FIELD

The present disclosure relates to the field of display technologies, more specifically, to a spacer supportability evaluation method and device, as well as a computer readable storage medium.

BACKGROUND

Liquid crystal display devices are currently the mainstream of flat panel display, and the liquid crystal panel is an important component thereof. The liquid crystal panel comprises a color filter substrate and an array substrate, between which a liquid crystal is disposed. In order to maintain the uniformity of the cell gap of the liquid crystal cell and prevent the liquid crystal device from being unable to display due to deformation of the liquid crystals caused by extrusion force, a post spacer (PS) having an elastic restoring force is usually arranged between the array substrate and the color filter substrate, which can keep the cell gap stable and uniform when the post spacer is in a compressed state and supports the liquid crystal cell.

SUMMARY

An embodiment of the disclosure provides a spacer supportability evaluation method, which comprises the following steps: acquiring an initial distribution image of spacers and an initial distribution image of corresponding support pads on a substrate; performing binary grayscaling processing to the initial distribution image of spacers and the initial distribution image of corresponding support pads respectively to obtain a distribution image of spacers and a distribution image of corresponding support pads, wherein a grayscale of each pixel of the distribution image of spacers and the distribution image of corresponding support pads is represented by a first value or a second value, the first value being one of a numeral 1 and a numeral 0, and the second value being the other of the numeral 1 and the numeral 0; obtaining a first binary matrix according to the distribution image of spacers, and obtaining a second binary matrix according to the distribution image of support pads, wherein each element in the first binary matrix corresponds to each pixel of the distribution image of spacers, a value of each element in the first binary matrix is the grayscale of a corresponding pixel of the distribution image of spacers, each element in the second binary matrix corresponds to each pixel of the is distribution image of support pads, and a value of each element in the second binary matrix is the grayscale of a corresponding pixel of the distribution image of support pads; subjecting the first binary matrix and the second binary matrix to convolution in a spatial domain or to multiplication in a frequency domain to obtain an equivalent support matrix; and calculating a number of elements in the equivalent support matrix whose values are the first value to obtain a number of supported pixels, a ratio of the number of supported pixels to a total number of pixels of the distribution image of spacers is used to indicate a supportability evaluation result for the spacers and the corresponding support pads.

In some embodiments, a step of acquiring an initial distribution image of spacers and an initial distribution image of corresponding support pads on a substrate comprises: obtaining sizes of the spacers and the corresponding support pads, their positional arrangements on the substrate and shapes; and acquiring the initial distribution image of spacers and the initial distribution image of corresponding support pads based on the sizes, the positional arrangements and the shapes.

In some embodiments, the method further comprises: prior to performing binary grayscaling processing to the initial distribution image of spacers and the initial distribution image of corresponding support pads, performing pixel division for the initial distribution image of spacers and the initial distribution image of corresponding support pads.

In some embodiments, a step of performing binary grayscaling processing to the initial distribution image of spacers and the initial distribution image of corresponding support pads respectively comprises: assigning a grayscale value of $2^n-1$ to pixels of the initial distribution image of spacers which are provided with a spacer; setting grayscale values of pixels of the initial distribution image of spacers which are not provided with a spacer to 0; setting grayscale values of pixels of the initial distribution image of corresponding support pads which are is provided with a support pad to $2^n-1$; and setting grayscale values of pixels of the initial distribution image of support pads which are not provided with a support pad to 0, the grayscale value $2^n-1$ corresponding to the numeral 1.

In some embodiments, the step of performing binary grayscaling processing to the initial distribution image of spacers and the initial distribution image of corresponding support pads respectively comprises: assigning any value between 0 and $2^n-1$ to pixels in edge areas of a single spacer image in the initial distribution image of spacers, representing grayscales of pixels of the initial distribution image of spacers whose grayscales are greater than a threshold value by the first value, and representing grayscales of pixels whose grayscales are less than the threshold value by the second value to obtain the distribution image of spacers; assigning any value between 0 and $2^n-1$ to pixels in edge areas of a single support pad image of the initial distribution image of support pads, representing grayscales of pixels in the initial distribution image of support pads whose grayscales are greater than the threshold value by the first value, and representing grayscales of pixels whose grayscales are less than the threshold value by the second value to obtain the distribution image of corresponding support pads.

In some embodiments, a size of each pixel of the initial distribution image of spacers and the initial distribution image of corresponding support pads is 1 to 2 μm.

In some embodiments, the method further comprises causing spacer images to be displaced by different distances in different directions with respect to support pad images to obtain initial distribution images of spacers and support pads having displacement, and obtaining the supportability evaluation result for the spacers and the support pads based on the initial distribution images of spacers and support pads having displacement.

In some embodiments, the method further comprises presenting the is supportability evaluation result for the spacers and the support pads in a distribution diagram.

A further embodiment of the disclosure provides a spacer supportability evaluation device, comprising an acquisition unit and a data processing unit. The acquisition unit is configured to acquire an initial distribution image of spacers and an initial distribution image of corresponding support pads on a substrate. The data processing unit comprises a grayscaling module, a grayscale matrix acquisition module, an image superposition module, and a calculation unit. The grayscaling module is configured to perform binary grayscaling processing to the initial distribution image of spacers and the initial distribution image of corresponding support pads respectively to obtain a distribution image of spacers and a distribution image of corresponding support pads. A grayscale of each pixel of the distribution image of spacers and the distribution image of corresponding support pads is represented by a first value or a second value, the first value being one of a numeral 1 and a numeral 0, the second value being the other of the numeral 1 and the numeral 0. The grayscale matrix acquisition module is configured to obtain a first binary matrix according to the distribution image of spacers, and obtain a second binary matrix according to the distribution image of support pads, each element in the first binary matrix corresponds to each pixel of the distribution image of spacers, a value of each element in the first binary matrix is the grayscale of a corresponding pixel of the distribution image of spacers, each element in the second binary matrix corresponds to each pixel of the distribution image of support pads, and a value of each element in the second binary matrix is the grayscale of a to corresponding pixel of the distribution image of support pads. The image superposition module is configured to subject the first binary matrix and the second binary matrix to convolution in a spatial domain or to multiplication in a frequency domain to obtain an equivalent support matrix. The calculation unit is configured to calculate a number of is elements in the equivalent support matrix whose values are the first value to obtain a number of supported pixels, a ratio of the number of supported pixels to a total number of pixels of the distribution image of spacers is used to indicate a supportability evaluation result for the spacers and the corresponding support pads.

In some embodiments, the acquisition unit obtains sizes of the spacers and the corresponding support pads, their positional arrangements on the substrate and shapes and acquires the initial distribution image of spacers and the initial distribution image of corresponding support pads based on the sizes, the positional arrangements and the shapes.

In some embodiments, the grayscaling module is further configured to perform pixel division to the initial distribution image of spacers and the initial distribution image of corresponding support pads to obtain respective pixels of the distribution image of spacers and the distribution image of corresponding support pads.

In some embodiments, performing, by the grayscaling module, binary grayscaling processing to the initial distribution image of spacers and the initial distribution image of corresponding support pads respectively comprises: setting grayscale values of pixels of the initial distribution image of spacers which are provided with a spacer to $2^n-1$, setting grayscale values of pixels of the initial distribution image of spacers which are not provided with a spacer to 0, setting grayscale values of pixels of the initial distribution image of support pads which are provided with a support pad to $2^n-1$, and setting grayscale values of pixels of the initial distribution image of support pads which are not provided with a support pad to 0, a grayscale value of $2^n-1$ corresponding to the numeral 1.

In some embodiments, performing, by the grayscaling module, binary grayscaling processing to the initial distribution image of spacers and the initial distribution image of corresponding support pads respectively further comprises:

assigning any value between 0 and $2^n-1$ to pixels in edge areas of a single spacer image in the initial distribution image of spacers, representing grayscales of pixels of the initial distribution image of spacers whose grayscales are greater than a threshold value by the first value, and representing grayscales of pixels whose grayscales are less than the threshold value by the second value to obtain the distribution image of spacers; assigning any value between 0 and $2^n-1$ to pixels in edge areas of a single support pad image of the initial distribution image of support pads, representing grayscales of pixels in the initial distribution image of support pads whose grayscales are greater than the threshold value by the first value, and representing grayscales of pixels whose grayscales are less than the threshold value by the second value to obtain the distribution image of corresponding support pads.

In some embodiments, a size of each pixel of the initial distribution image of spacers and the initial distribution image of corresponding support pads is 1 to 2 μm.

In some embodiments, the data processing unit is further configured to cause spacer images on the substrate to be displaced by different distances in different directions with respect to support pad images to obtain initial distribution images of spacers and support pads having displacement, and obtaining the supportability evaluation result for the spacers and the support pads based on the initial distribution images of spacers and support pads having displacement.

In some embodiments, the evaluation device further comprises a display unit for presenting the supportability evaluation result for the spacers and the support pads in a distribution diagram.

Yet another embodiment of the disclosure provides a computer readable storage medium, comprising instructions that, when the computer readable storage medium runs on a computer, cause the computer to execute the method according to any of the above embodiments.

BRIEF DESCRIPTION OF DRAWINGS

Embodiments of the disclosure will be further described in detail below with reference to the accompanying drawings.

DETAILED DESCRIPTION OF EMBODIMENTS

Figure 1:
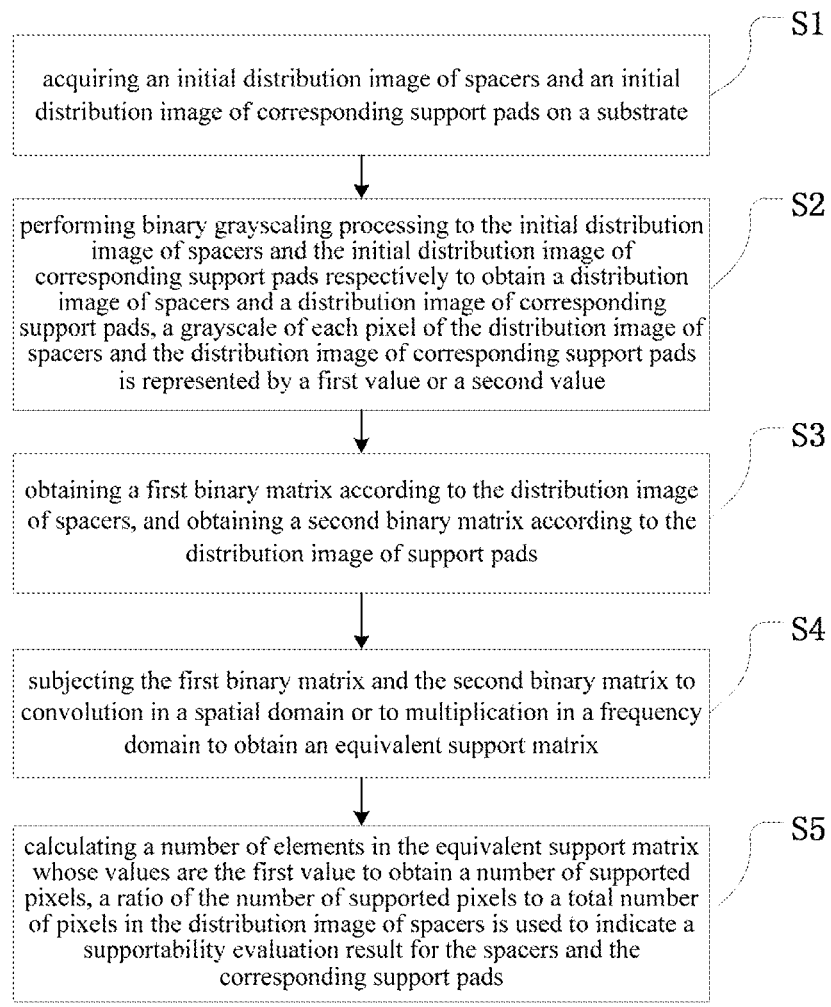
FIG. 1 is a flow chart of a spacer supportability evaluation method according to an embodiment of the present disclosure.

The disclosure will be further described below in conjunction with embodiments and the accompanying drawings. Similar components in the drawings are denoted by the same reference numerals. It should be understood by those skilled in the art that the detailed description below is intended to be illustrative and not restrictive, which is not to be construed as limiting the protection scope of the application.

For the convenience of fixing a spacer to achieve a better support effect, the spacer is typically disposed above the array substrate via a support pad. However, in practice, the color film substrate and the array substrate are sometimes not aligned due to deformation under external is force, and the spacer may restore to an uncompressed state. When the spacer is in a compressed state, it is on the support pad on the array substrate. Whereas when the external force disappears, it is difficult for the uncompressed spacer to return to the position on the support pad as the support pad may block the spacer, so that the stability and uniformity of the cell gap of the liquid crystal cell would be badly affected and even destroyed, which may result in a mura phenomenon such as "black gap", and causes a significant impact on the quality of a display.

As shown in FIG. 1, an embodiment of the disclosure provides a spacer supportability evaluation method, which comprises the following steps: acquiring an initial distribution image of spacers and an initial distribution image of corresponding support pads on a substrate; performing binary grayscaling processing to the initial distribution image of spacers and the initial distribution image of corresponding support pads respectively to obtain a distribution image of spacers and a distribution image of corresponding support pads, where a grayscale of each pixel of the distribution image of spacers and the distribution image of corresponding support pads being represented by a first value or a second value, the first value being one of the numeral 1 and the numeral 0, and the second value being the other of the numeral 1 and the numeral 0; obtaining a first binary matrix based on the distribution image of spacers, and obtaining a second binary matrix based on the distribution image of support pads, each element in the first binary matrix corresponding to each pixel of the distribution image of spacers, and the value of each element in the first binary matrix being a grayscale of a corresponding pixel of the distribution image of spacers, each element in the second binary matrix corresponding to each pixel of the distribution image of support pads, and the value of each element in the second binary matrix being a grayscale of a corresponding pixel of the distribution image of support pads; obtaining a matrix product of the first binary matrix and the second binary matrix as an equivalent support matrix; and calculating the is number of elements in the equivalent support matrix whose values are the first value as the number of supported pixels, a ratio of the number of supported pixels to the total number of pixels of the distribution image of spacers is used to indicate a supportability evaluation result for the spacers and the corresponding support pads.

The spacer mentioned herein may refer to a spacer applied in a liquid crystal display device, and it may also mean a spacer applied in an OLED display device or the like.

Figure 2:
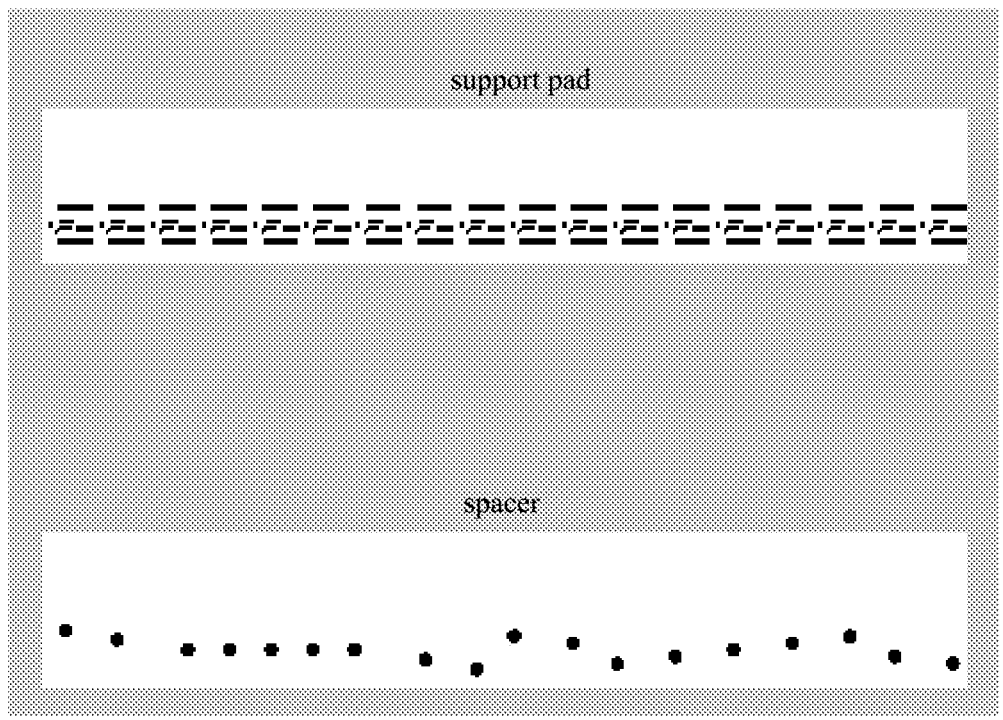
FIG. 2 is a view illustrating positional arrangement of spacers and corresponding support pads as provided by an embodiment of the present disclosure.

In some embodiments, data regarding sizes of spacers and support pads, their distributions on the substrate and shapes may be input into a computer, and initial distribution images of spacers and support pads can be made based on the data. Alternatively, initial distribution images of spacers and support pads may be obtained by directly providing a design drawing or a simulated diagram of spacers and support pads into a terminal device. An example of the initial distribution images of spacers and support pads is shown in FIG. 2.

After the initial distribution images of spacers and support pads have been made, pixel division is performed to the images. The pixel division is to represent the initial distribution image of spacers and the initial distribution image of support pads in the form of pixels. In some embodiments, the size of each pixel is not more than 2 μm, for example, each pixel has a size of 1 um. In this way, the initial distribution image of spacers and the initial distribution image of support pads are represented in the form of pixels.

The initial distribution image of spacers and the initial distribution image of support pads are subjected to binary grayscaling processing respectively. The grayscale values of pixels of the initial distribution image of spacers and the initial distribution image of support pads which are provided with a spacer are set to $2^n-1$, the grayscale values of the remaining pixels are set to 0 (background grayscale), where n is a positive integer. In some embodiments, the image of a single spacer is circular, is and a single pixel is a relatively small square. In this case, for some pixels, partial regions thereof are spacer images, and partial regions have a background grayscale. At that time, the grayscales of the pixels in edge areas of the image of a single spacer can be represented by grayscale values between 0 and $2^n-1$ in a gradually changed manner, so that the image of a single spacer is still close to a circular shape after being represented by pixels, achieving a smooth effect. In some embodiments, the grayscale values of pixels of the initial distribution image of spacers which are provided with a spacer are set to 255.

Figure 3:
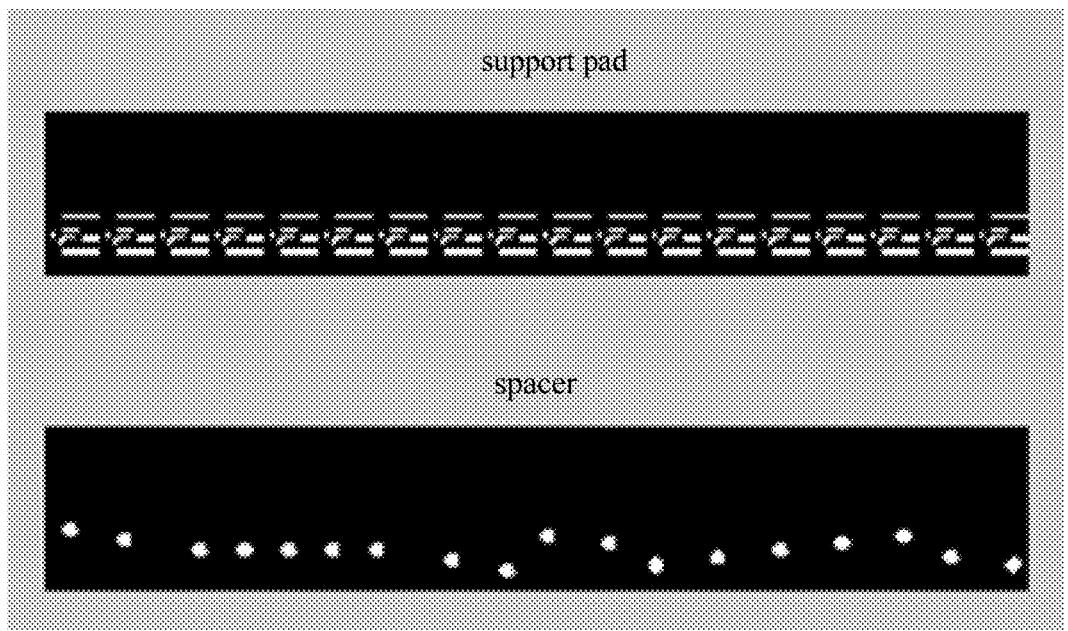
FIG. 3 is a schematic view showing the positional arrangement of spacers and corresponding support pads after being subjected to pixel grayscaling processing according to an embodiment of the present disclosure.

By performing binary grayscaling processing to the initial distribution image of spacers and the initial distribution image of support pads, distribution images of spacers and support pads are obtained. In an example, as shown in FIG. 3, in the distribution images of spacers and support pads, the image pixel grayscales of the spacers and the support pads are all set to 255, which is white, and the remaining background pixel grayscales are all set to 0, which is black. All the grayscale values are then converted into two numbers of 0 and 1, where the grayscale value 0 corresponds to the numeral 0, and the grayscale value 255 corresponds to the numeral 1. For the pixel edge areas having grayscale values between 0 and 255, areas whose grayscale values are greater than a threshold value (e.g., 150) correspond to the numeral 1, and areas whose grayscale values are less than or equal to the threshold value (e.g., 150) corresponding to 0. Alternatively, the grayscale value 0 may be set to correspond to the numeral 1, and the grayscale value 255 is set to correspond to the numeral 0, such that the grayscale of each pixel of the distribution images is represented with 0 or 1.

In this way, the grayscale of the distribution image of spacers is represented by a first binary matrix composed of 0 and 1, and the grayscale of the distribution image of support pads is represented by a second binary matrix composed of 0 and 1. In this embodiment, a binary matrix means that the values of elements in the matrix can only be 0 or 1, is each value in the binary matrix represents the grayscale value of each pixel of an image obtained by binary grayscaling processing, and the position of each element in the matrix corresponds to an arrangement position of a pixel of the image, which simplifies the subsequent calculation and improves the evaluation efficiency.

Figure 4:
FIG. 4 is a schematic view of an equivalent support matrix provided by an embodiment of the present disclosure.

The first binary matrix of the grayscale of the distribution image of spacers and the second binary matrix of the grayscale of the distribution image of support pads are superimposed. For example, the first binary matrix and the second binary matrix are subjected to convolution in a spatial domain or to multiplication in a frequency domain to carry out image multiplication, thereby obtaining an equivalent support matrix. FIG. 4 schematically shows an equivalent support matrix obtained by performing multiplication of two binary matrices.

In this embodiment, if the value of an element of the binary matrix of the grayscale of the distribution image of spacers and the value of an element at a corresponding position of the binary matrix of the grayscale of the distribution image of support pads are both 1, the value of an element at the corresponding position in the equivalent support matrix is 1. If the value of an element at a certain position in one of the matrices is 0, and the value of an element at a corresponding position in the other matrix is 1, the value of an element at the corresponding position in the equivalent support matrix is 0, which indicates that a spacer at that position and a corresponding support pad are not aligned, so the corresponding value of the equivalent support matrix should also be displayed as 0. In FIG. 4 that schematically shows a result of superimposing a grayscaled distribution image of spacers and the grayscaled distribution image of support pads, the white portions correspond to positions of the elements in the equivalent support matrix that have a value of 1, the remaining black portions correspond to positions of the elements in the equivalent support matrix that have a value of 0.

The number of pixels whose grayscale values are 1 in the equivalent support matrix is calculated to obtain a number S of effective supported pixels. A ratio S/N of the number S of effective supported pixels S to the total number N of pixels in the spacer image is used to indicate a supportability evaluation result for the spacers and the corresponding support pads.

The obtained evaluation result can be shown to the terminal device in the form of a graph, and an intuitive evaluation result can be obtained.

In another embodiment, in order to achieve a more accurate evaluation result, the images of spacers and the images of corresponding support pads are relatively displaced (which may be displaced by different distances in different directions) to obtain an initial distribution image of spacers and corresponding support pads having relative displacements. Hence, displacement magnitudes of the spacers in different directions in practice are simulated to evaluate whether the supportability can meet requirements in case of certain displacement distances (e.g., offset by 40 µm) in various directions. Then, the obtained distribution images are subjected to pixelation processing and grayscaling processing to form binary matrices. Finally, image superposition is performed to obtain supportability evaluation results for the spacers and the support pads having relative displacements.

Figure 6:
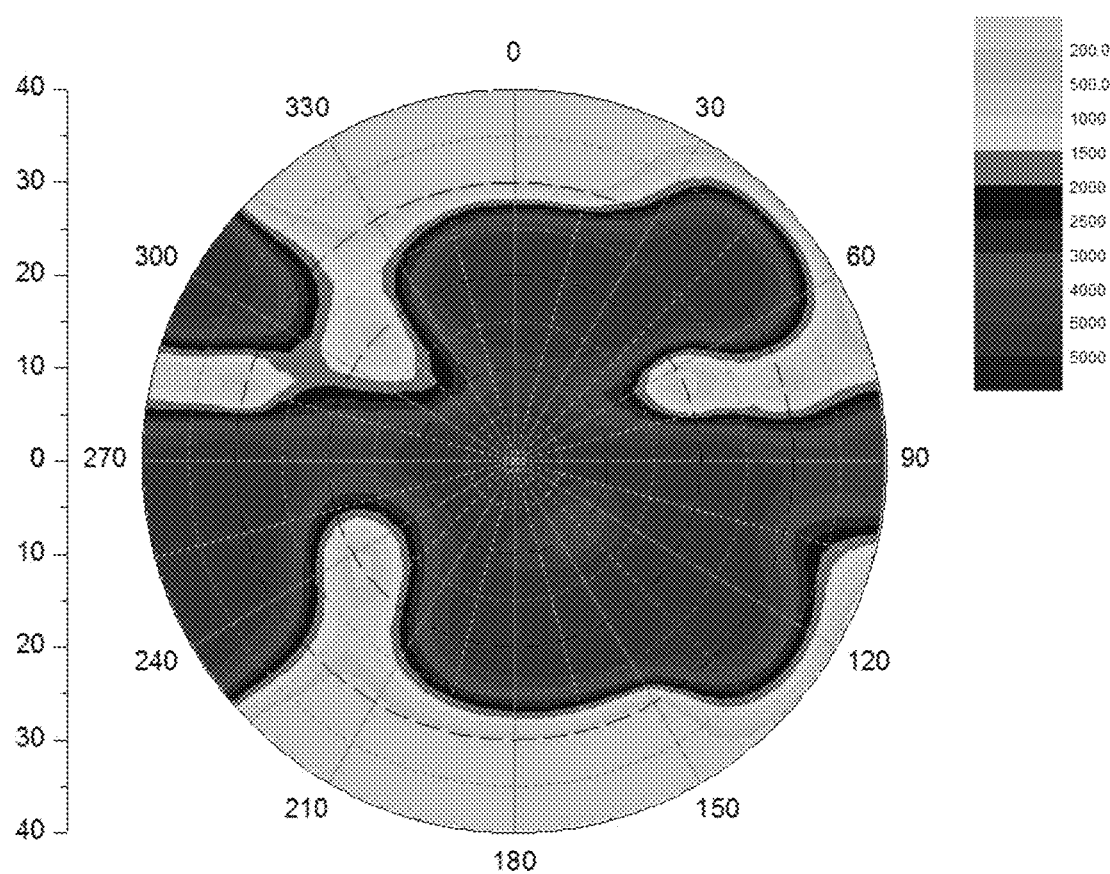
FIG. 6 is a distribution diagram of spacer supportability distribution shown by a spacer supportability evaluation device according to an embodiment of the present disclosure.

As shown in FIG. 6, which illustrates a supportability distribution diagram, where the left numerals ranging from 0 to 40 indicate distances of relative displacement between a spacer and a corresponding support pad, different angles on the circle represent various directions of relative displacements, and the color depth indicates specific numerical ranges of the supportability (cf. the right upper of FIG. 6).

In this way, the relationship between the offset distance and the supportability of a spacer when it is displaced in various directions can be seen very intuitively, so that the arrangement of the spacers can be advantageously adjusted to make each spacer in a position having a maximum supportability value, is which improves the supportability and the work efficiency of the spacer.

Figure 5:
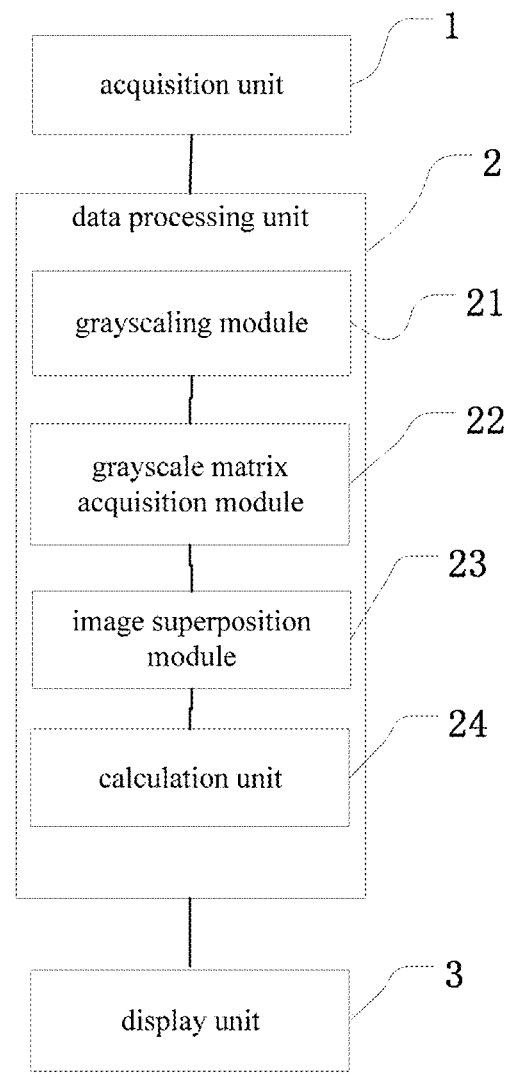
FIG. 5 is a schematic view of a spacer supportability evaluation device according to an embodiment of the present disclosure.

Another embodiment of the present disclosure provides a spacer supportability evaluation device, as shown in FIG. 5, which performs evaluation of the supportability of spacers using the method described in the above embodiment, and comprises an acquisition unit 1 and a data processing unit 2. The acquisition unit 1 may include an input terminal device, a memory and the like, for acquiring images of spacers and images of corresponding support pads, that is, the input terminal device may receive an initial distribution image of spacers and an initial distribution image of corresponding support pads on a substrate, and these images can be stored in the memory. The data processing unit 2 is a processor, which comprises a grayscaling module 21, a grayscale matrix acquisition module 22, an image superposition module 23, and a calculation unit 24. The above modules can run on a terminal device and evaluate the supportability of spacers under the control of the processor.

The grayscaling module 21 is configured to perform binary grayscaling processing to the initial distribution image of spacers and the initial distribution image of corresponding support pads respectively to obtain a distribution image of spacers and a distribution image of corresponding support pads, a grayscale of each pixel of the distribution image of spacers and the distribution image of corresponding support pads is represented by a first value or a second value, the first value being one of the numeral 1 and the numeral 0, and the second value being the other of the numeral 1 and the numeral 0.

The grayscale matrix acquisition module 22 is configured to obtain a first binary matrix according to the distribution image of spacers, and to obtain a second binary matrix according to the distribution image of support pads, where each element in the first binary matrix corresponds to each pixel of the distribution image of spacers, and the value of each element in the first binary matrix is a grayscale of a corresponding pixel of the distribution image of spacers, each element in the second binary is matrix corresponds to each pixel of the distribution image of support pads, and the value of each element in the second binary matrix is a grayscale of a corresponding pixel of the distribution image of support pads.

The image superposition module 23 is configured to subject the first binary matrix and the second binary matrix to convolution in a spatial domain or to multiplication in a frequency domain to obtain an equivalent support matrix.

The calculation unit 24 is configured to calculate the number of elements in the equivalent support matrix whose values are the first value as the number of supported pixels, a ratio of the number of supported pixels to the total number of pixels in the distribution image of spacers is used to indicate a supportability evaluation result for the spacers and the corresponding support pads.

Finally, the obtained evaluation result is provided to a terminal device and shown by a display unit 3 in the form of a graph, thus an intuitive evaluation result is obtained.

In an embodiment, the grayscaling module 21 further performs pixel division to the initial distribution image of spacers and the initial distribution image of corresponding support pads to obtain respective pixels of the distribution image of spacers and the distribution image of support pads.

That is, the grayscaling module 21 divides the distribution image of spacers and the distribution image of support pads into a plurality of sub-regions (i.e., pixels) according to the areas of the distribution image of spacers and the distribution image of support pads, and a desired size of each pixel (e.g., 1 to 2 μm). On such basis, it is possible to identify or determine which pixels have spacer images or support pad images. For those pixels completely filled with spacer images or support pad images, the grayscales thereof may be represented as, for example, the numeral 1 which may correspond to the grayscale value $2^n-1$ (n is a positive integer). For those pixels having no spacer image or support pad image, the grayscales thereof may be represented as, for is example, the numeral 0 which may correspond to the grayscale value 0.

On such basis, the grayscale matrix acquisition module 22 can easily form the first binary matrix and the second binary matrix. For example, elements in the first binary matrix and the second binary matrix correspond to respective pixels in the distribution image of spacers and the distribution image of support pads respectively, and only include two kinds of elements of numeral 1 and numeral 0. In some embodiments, the numeral 1 corresponds to pixels including spacer images or support pad images, and the numeral 0 corresponds to pixels including no spacer image or support pad image. Therefore, the process for the grayscale matrix acquisition module 22 to obtain the first binary matrix and the second binary matrix is actually a process of re-expressing the pixels of the distribution image of spacers and the distribution image of support pads in matrices including two kinds of elements.

In another embodiment, the processor unit is further configured to obtain images of spacers and support pads having relative displacements after the image of spacers is relatively displaced by different distances in different directions with respect to the image of corresponding support pads, so that offsets of the spacers in different directions in practice are simulated to evaluate whether the supportability can meet requirements within certain offset distances (e.g., offset by 40 um) in various directions. Then, the newly obtained images are subjected to pixelation processing and grayscaling processing again to form binary matrices. Finally, image superposition is performed to obtain supportability evaluation results for the spacers and the support pads having relative displacements. In this way, the evaluation result can be more accurate.

An embodiment of the present disclosure further provides a computer readable storage medium such as a floppy disk driver, a hard disk driver, a CD-ROM, a magneto-optical disk, and the like. The computer readable storage medium stores instructions that, when it is run on a computer, cause the computer to execute the method described in the is above method embodiments.

An embodiment of the disclosure may evaluate and test the supportability of spacers by obtaining parameters or design drawings of the spacers so as to determine the most suitable size and arrangement position of each spacer, which improves the supportability of spacers and helps to keep the cell gap of the liquid crystal cell stable and uniform.

The above-described embodiments are merely examples for clearly illustrating the present disclosure, and are not intended to limit implementations of the present disclosure. For those ordinarily skilled in the art, other variations or modifications in different forms may also be made based on the above description. Implementations described herein are not exhaustive. Any obvious variations or modifications which derive from the technical solutions of the present disclosure still fall within the protection scope of the present application.

The invention claimed is:

1. A spacer supportability evaluation method, comprising:
   acquiring an initial distribution image of spacers and an initial distribution image of corresponding support pads on a substrate;
   performing binary grayscaling processing to the initial distribution image of spacers and the initial distribution image of corresponding support pads respectively to obtain a distribution image of spacers and a distribution image of corresponding support pads, wherein a grayscale of each pixel of the distribution image of spacers and the distribution image of corresponding support pads is represented by a first value or a second value, wherein the first value is one of a numeral 1 and a numeral 0, and the second value is one of the numeral 1 and the numeral 0 that is different from the first value;
   obtaining a first binary matrix according to the distribution image of spacers, and obtaining a second binary matrix according to the distribution image of support pads, wherein each element in the first binary matrix corresponds to each pixel of the distribution image of spacers, wherein a value of each element in the first binary matrix corresponds to the grayscale of each pixel of the distribution image of spacers, wherein each element in the second binary matrix corresponds to each pixel of the distribution image of corresponding support pads, and wherein a value of each element in the second binary matrix corresponds to a grayscale of a corresponding pixel of the distribution image of support pads;
   subjecting the first binary matrix and the second binary matrix to convolution in a spatial domain or to multiplication in a frequency domain to obtain an equivalent support matrix;
   calculating a number of elements in the equivalent support matrix whose values are the first value to obtain a number of supported pixels,
   wherein a ratio of the number of supported pixels to a total number of pixels of the distribution image of spacers indicates a supportability evaluation result for the spacers and the corresponding support pads.

2. The evaluation method according to claim 1, wherein the acquiring the initial distribution image of spacers and the initial distribution image of corresponding support pads on the substrate comprises:
   obtaining sizes of the spacers and the corresponding support pads, positional arrangements on the substrate of the spacers and the corresponding support pads and shapes of the spacers and the corresponding support pads; and
   acquiring the initial distribution image of spacers and the initial distribution image of corresponding support pads based on the sizes, the positional arrangements and the shapes.

3. The evaluation method according to claim 1, wherein the method further comprises:
   prior to performing binary grayscaling processing to the initial distribution image of spacers and the initial distribution image of corresponding support pads, performing pixel division for the initial distribution image of spacers and the initial distribution image of corresponding support pads.

4. The evaluation method according to claim 3, wherein the performing binary grayscaling processing to the initial distribution image of spacers and the initial distribution image of corresponding support pads respectively comprises:

assigning a grayscale value of $2^n-1$ to pixels of the initial distribution image of spacers which are provided with a spacer;

setting grayscale values of pixels of the initial distribution image of spacers which are not provided with a spacer to 0;

setting grayscale values of pixels of the initial distribution image of corresponding support pads which are provided with a support pad to $2^n-1$; and setting grayscale values of pixels of the initial distribution image of support pads which are not provided with a support pad to 0, wherein the grayscale value $2^n-1$ corresponds to the numeral 1.

5. The evaluation method according to claim 4, wherein the of performing binary grayscaling processing to the initial distribution image of spacers and the initial distribution image of corresponding support pads respectively comprises:

assigning a third value between 0 and $2^n-1$ to pixels in edge areas of a single spacer image in the initial distribution image of spacers, representing grayscales of pixels of the initial distribution image of spacers whose grayscales are greater than a threshold value by the first value, and representing grayscales of pixels whose grayscales are less than the threshold value by the second value to obtain the distribution image of spacers; and assigning a fourth value between 0 and $2^n-1$ to pixels in edge areas of a single support pad image of the initial distribution image of support pads, representing grayscales of pixels in the initial distribution image of support pads whose grayscales are greater than the threshold value by the first value, and representing grayscales of pixels whose grayscales are less than the threshold value by the second value to obtain the distribution image of corresponding support pads.

6. The evaluation method according to claim 3, wherein a size of each pixel of the initial distribution image of spacers and the initial distribution image of corresponding support pads is 1 μm to 2 μm.

7. The evaluation method according to claim 1, wherein the method further comprises:

causing spacer images to be displaced by different distances in different directions with respect to support pad images to obtain a plurality of initial distribution images of spacers and support pads having displacement; and obtaining the supportability evaluation result for the spacers and the support pads based on the plurality of initial distribution images of spacers and support pads having displacement.

8. The evaluation method according to claim 7, wherein the method further comprises:

presenting the supportability evaluation result for the spacers and the support pads in a distribution diagram.

9. A spacer supportability evaluation device, comprising:
an acquisition unit and
a data processing unit,
wherein the acquisition unit is configured to acquire an initial distribution image of spacers and an initial distribution image of corresponding support pads on a substrate, wherein the data processing unit comprises a grayscaling module, a grayscale matrix acquisition module, an image superposition module, and a calculation unit, wherein the grayscaling module is configured to perform binary grayscaling processing to the initial distribution image of spacers and the initial distribution image of corresponding support pads respectively to obtain a distribution image of spacers and a distribution image of corresponding support pads, wherein a grayscale of each pixel of the distribution image of spacers and the distribution image of corresponding support pads is represented by a first value or a second value, wherein the first value is one of a numeral 1 and a numeral 0, and the second value is one of the numeral 1 and the numeral 0 that is different from the first value;

wherein the grayscale matrix acquisition module is configured to obtain a first binary matrix according to the distribution image of spacers, and obtain a second binary matrix according to the distribution image of support pads, wherein each element in the first binary matrix corresponds to each pixel of the distribution image of spacers, wherein a value of each element in the first binary matrix corresponds to the grayscale of each pixel of the distribution image of spacers, wherein each element in the second binary matrix corresponds to each pixel of the distribution image of corresponding support pads, and wherein a value of each element in the second binary matrix corresponds to a grayscale of a corresponding pixel of the distribution image of support pads;

wherein the image superposition module is configured to subject the first binary matrix and the second binary matrix to convolution in a spatial domain or to multiplication in a frequency domain to obtain an equivalent support matrix;

wherein the calculation unit is configured to calculate a number of elements in the equivalent support matrix whose values are the first value to obtain a number of supported pixels, wherein a ratio of the number of supported pixels to a total number of pixels of the distribution image of spacers indicates a supportability evaluation result for the spacers and the corresponding support pads.

10. The spacer supportability evaluation device according to claim 9, wherein the acquisition unit is configured to obtain sizes of the spacers and the corresponding support pads, positional arrangements on the substrate of the spacers and the corresponding support pads and shapes of the spacers and the corresponding support pads, and is configured to acquire the initial distribution image of spacers and the initial distribution image of corresponding support pads based on the sizes, the positional arrangements and the shapes.

11. The spacer supportability evaluation device according to claim 9, wherein the grayscaling module is further configured to perform pixel division to the initial distribution image of spacers and the initial distribution image of corresponding support pads to obtain respective pixels of the distribution image of spacers and the distribution image of corresponding support pads.

12. The spacer supportability evaluation device according to claim 11, wherein the grayscaling module is configured to perform binary grayscaling processing to the initial distribution image of spacers and the initial distribution image of corresponding support pads respectively by performing operations comprising:

setting grayscale values of pixels of the initial distribution image of spacers which are provided with a spacer to $2^n-1$, setting grayscale values of pixels of the initial distribution image of spacers which are not provided with a spacer to 0, setting grayscale values of pixels of the initial distribution image of support pads which are provided with a support pad to $2^n-1$, and setting grayscale values of pixels of the initial distribution image of support pads which are not provided with a support pad to 0, wherein a grayscale value of $2^n-1$ corresponds to the numeral 1.

13. The spacer supportability evaluation device according to claim 10, wherein the grayscaling module is configured to perform binary grayscaling processing to the initial distribution image of spacers and the initial distribution image of corresponding support pads respectively by performing operations further comprising:

assigning a third value between 0 and $2^n-1$ to pixels in edge areas of a single spacer image in the initial distribution image of spacers, representing grayscales of pixels of the initial distribution image of spacers whose grayscales are greater than a threshold value by the first value, and representing grayscales of pixels whose grayscales are less than the threshold value by the second value to obtain the distribution image of spacers; and assigning a fourth value between 0 and $2^n-1$ to pixels in edge areas of a single support pad image of the initial distribution image of support pads, representing grayscales of pixels in the initial distribution image of support pads whose grayscales are greater than the threshold value by the first value, and representing grayscales of pixels whose grayscales are less than the threshold value by the second value to obtain the distribution image of corresponding support pads.

14. The spacer supportability evaluation device according to claim 11, wherein a size of each pixel of the initial distribution image of spacers and the initial distribution image of corresponding support pads is 1 μm to 2 μm.

15. The spacer supportability evaluation device according to claim 9, wherein the data processing unit is further configured to cause spacer images on the substrate to be displaced by different distances in different directions with respect to support pad images to obtain a plurality of initial distribution images of spacers and support pads having displacement, and obtain the supportability evaluation result for the spacers and the support pads based on the plurality of initial distribution images of spacers and support pads having displacement.

16. The spacer supportability evaluation device according to claim 15, wherein the evaluation device further comprises a display unit for presenting the supportability evaluation result for the spacers and the support pads in a distribution diagram.

17. A computer readable storage medium, comprising instructions that, when the computer readable storage medium runs on a computer, cause the computer to execute the method according to claim 1.

* * * * *